UNITED STATES PATENT OFFICE.

JAMES P. A. McCOY, OF WILKINSBURG, PENNSYLVANIA, ASSIGNOR TO WESTINGHOUSE ELECTRIC AND MANUFACTURING COMPANY, A CORPORATION OF PENNSYLVANIA.

PROCESS OF HARDENING PHENOLIC CONDENSATION PRODUCTS.

1,269,627.      Specification of Letters Patent.     Patented June 18, 1918.

No Drawing.      Application filed July 3, 1914. Serial No. 848,802.

*To all whom it may concern:*

Be it known that I, JAMES P. A. McCOY, a subject of the King of Great Britain, and a resident of Wilkinsburg, in the county of Allegheny and State of Pennsylvania, have invented a new and useful Improvement in Processes of Hardening Phenolic Condensation Products, of which the following is a specification.

My invention relates to processes of hardening phenolic condensation products and other substances containing free phenolic material, and it has special reference to the regulation of the hardening of such substances in connection with the manufacture of molded articles.

The objects of my invention are to provide a method of regulating the hardening of phenolic condensation products, and to make it possible to manufacture molded articles from such products in a shorter time than has heretofore been commercially practicable.

Phenolic condensation products, produced by reaction between phenolic bodies and substances containing active replaceable methylene groups, are well suited to the manufacture of insulating articles and other molded shapes, but, according to the processes heretofore employed, it has been necessary to expend considerable time in the molding of each article, because of the relatively slow rate at which the condensation products are transformed from the plastic, fusible condition into the hard and infusible condition. As these molded articles have heretofore been prepared, the condensation product, ordinarily in its solid and fusible condition, is finely ground and mixed with a filler, such as finely divided asbestos or wood flour, and the mixture is then pressed in a heated mold for several minutes.

In their solid fusible condition, the phenolic condensation products of commerce contain an excess of phenolic material, and attempts have been made to accelerate their hardening rate by the addition of formaldehyde, in the presence of an excess of a catalyzing or condensing agent. It is found, however, that under these conditions, the hardening takes place so rapidly as to produce a non-plastic mass. Furthermore, the formaldehyde is ordinarily applied in water solution, and, on account of the water present, the accelerating means just described cannot be applied to the molding art, where the amount of liquid present must be kept as small as possible.

In the manufacture of commercial phenolic condensation products, it is necessary that the catalyzing or condensing agent be present only in a sufficient amount to bring about the reaction between the phenol and the formaldehyde, or their equivalents, since an excess of catalyzing agent renders the reaction uncontrollable and so greatly hastens the reaction velocity that the infusible condition is rapidly reached.

According to my present invention, I take advantage of the rapid hardening of phenol resins caused by the presence of excess amounts of formaldehyde and catalytic material, and produce dry condensation masses that can be molded very rapidly. In general, my process consists in mixing a fusible phenolic condensation product which already contains an excess of phenols and a small amount of catalytic material, with a substance that can be decomposed by the action of heat or pressure, or both, with evolution of formaldehyde. A further amount of catalytic material is also preferably added. The mixture is then molded in the usual manner, and the pressure in the mold decomposes the formaldehyde-containing body, liberating formaldehyde. The reaction then proceeds as described above, the excess of catalyst effecting rapid combination between the phenols present and the liberated aldehyde which, in its nascent state, combines very readily with the phenols. The velocity of the reaction is still further increased by the pressure in the mold, and it becomes almost instantaneous, so that molded articles may be made as rapidly as the speed of the molding machines and the skill of their operators will permit. The fusible phenolic resins flow very easily under pressure at relatively low temperatures, and they may therefore be molded without great heat.

The polymerids of formaldehyde, such as paraformaldehyde, trioxymethylene, etc., are well suited for use in my process as sources of nascent formaldehyde, and as the condensing agent, I may employ any of the acid and basic contact substances that are well known in the synthetic resin art. Certain advantages, however, are obtained by the use of tannins as condensing agents, since these substances are themselves natural binding agents and are capable of forming condensation products with formaldehyde and other methylene-containing substances. For example, catechol tannin, which is essentially a dihydric phenol, is an excellent condensing agent for use in my process, because it not only acts as a catalytic agent but also may take part as a phenolic substance in the reaction. Tannins of this character may be employed in any desired proportions, since they form condensation products which have no deleterious effect upon the dielectric and mechanical properties of the final products.

In carrying out one example of my process, I first form a molding mixture of a resinous condensation product containing a considerable excess of phenol, such as the so-called novolak, or any of the various condensation products formed by reaction between phenolic substances and formaldehyde, hexamethylene tetramin, etc., and then add to the mass, either with or without the addition of a pulverized filler, a small amount of a polymerid of formaldehyde, together with a suitable amount of catechol tannin or other suitable condensing agent. I then mold the mass in the usual manner under heat and pressure, and under these conditions, the polymerid decomposes with evolution of formaldehyde, and the formaldehyde so generated combines with the excess of phenol present in the condensation product and effects the hardening of the mass in the manner described above.

The exact amounts of the polymerid and of the condensing agent which should be added depend, of course, upon the amount of free phenol present in the resin that is selected. For example, a common form of synthetic resin is formed by reaction between six molecules of phenol and one molecule of hexamethylene-tetramin. With this particular condensation product, I find it convenient to employ, as the source of nascent formaldehyde, about one per cent., by weight, of trioxymethylene and a similar amount of catechol tannin.

For carrying out my process, any of the polymerids of formaldehyde are suitable. Among them are paraformaldehyde, trioxymethylene and the other polyoxymethylenes having the general formula $(CH_2O)_n$. Any phenolic condensation product may be selected that contains an excess of phenol or other compound that is capable of rapid reaction with the formaldehyde generated during my process. In view of the wide range of substances and conditions to which my process is applicable, it is to be understood that no limitations are to be imposed upon my invention except such as are indicated in the appended claims.

I claim as my invention:

1. The process of hardening fusible phenolic condensation products that comprises adding to such a product a substance that is capable of being decomposed with evolution of formaldehyde and a tannin condensing agent having no deleterious effect upon the dielectric strength of the resulting product and causing the said decomposable substance to decompose.

2. The process of hardening fusible phenolic condensation products that comprises adding to such a product a substance that is capable of being decomposed with evolution of formaldehyde and a tannin condensing agent which is itself capable of forming a condensation product with a methylene-containing substance and causing the said substance to decompose.

3. The process of hardening fusible phenolic condensation products that comprises adding to such a product a polymerid of formaldehyde and a tannin condensing agent which is itself capable of forming a condensation product with a methylene-containing substance and causing the said polymerid to decompose with evolution of formaldehyde.

4. The process of hardening a substance containing free phenolic material that comprises adding to such a substance a body capable of being decomposed with evolution of formaldehyde and a tannin condensing agent which is itself capable of forming a condensation product with a methylene-containing substance and causing the said substance to decompose.

5. The process of hardening a substance containing free phenolic material that comprises adding to such a substance a tannin and a substance capable of being decomposed with evolution of formaldehyde and causing the said decomposable substance to decompose.

6. The process of hardening a substance containing free phenolic material that comprises adding to such a substance catechol tannin and a substance capable of being decomposed with evolution of formaldehyde and causing the said decomposable substance to decompose.

7. The process of hardening fusible phenolic condensation products that comprises adding to such a product catechol tannin and paraformaldehyde and causing the paraformaldehyde to decompose with evolution of formaldehyde.

In testimony whereof, I have hereunto subscribed my name this 30th day of June, 1914.

JAMES P. A. McCOY.

Witnesses:
W. H. KEMPTON,
B. B. HINES.